United States Patent
Kim et al.

(10) Patent No.: US 7,070,313 B2
(45) Date of Patent: Jul. 4, 2006

(54) LAMP GUIDE DEVICE AND BACKLIGHT ASSEMBLY FOR LIQUID CRYSTAL DISPLAY DEVICE USING THE SAME

(75) Inventors: Kyoung-Sub Kim, Gyeongsangbuk-do (KR); Seung-Hoon Kim, Dae-gu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 64 days.

(21) Appl. No.: 10/878,344

(22) Filed: Jun. 29, 2004

(65) Prior Publication Data
US 2005/0073858 A1 Apr. 7, 2005

(30) Foreign Application Priority Data
Oct. 7, 2003 (KR) ............... 10-2003-0069461

(51) Int. Cl.
*A47F 3/00* (2006.01)
(52) U.S. Cl. .................. 362/561; 362/306; 349/58
(58) Field of Classification Search ........... 362/561, 362/33, 97, 223, 224, 306; 349/62, 67, 58
See application file for complete search history.

(56) References Cited

U.S. PATENT DOCUMENTS

| | | | |
|---|---|---|---|
| 6,783,256 B1 * | 8/2004 | Moon | 362/241 |
| 6,902,300 B1 * | 6/2005 | Lee | 362/306 |
| 2002/0013924 A1 * | 1/2002 | Yamamoto | 714/763 |
| 2002/0113924 A1 * | 8/2002 | Saito et al. | 349/112 |

FOREIGN PATENT DOCUMENTS

| | | | |
|---|---|---|---|
| JP | 07-064084 | * | 10/1995 |
| JP | 10-326517 | * | 12/1998 |

* cited by examiner

*Primary Examiner*—Ali Alavi
*Assistant Examiner*—Hargobind S. Sawhney
(74) *Attorney, Agent, or Firm*—Morgan, Lewis & Bockius, LLP

(57) ABSTRACT

A direct-type backlight assembly for a liquid crystal display device includes a lower case, a plurality of lamps disposed over a first surface of the lower case, a plurality of optical sheets disposed over the first surface of the lower case, and a lamp guide disposed on the first surface of the lower case, the lamp guide including a plate parallel to and disposed on the first surface of the lower case, a sheet supporting portion formed on a first surface of the plate to support the optical sheets, a plurality of lamp holders formed on the first surface of the plate to affix the plurality of lamps therein, and a case connector connected to a second surface of the plate and having a plurality of protrusions facing the second surface of the plate.

25 Claims, 7 Drawing Sheets

US 7,070,313 B2

LAMP GUIDE DEVICE AND BACKLIGHT ASSEMBLY FOR LIQUID CRYSTAL DISPLAY DEVICE USING THE SAME

The present invention claims the benefit of Korean Patent Application No. 2003-0069461, filed in Korea on Oct. 7, 2003, which is hereby incorporated by reference.

BACKGROUND OF THE INVENTION

1. Field of the Invention

The present invention relates to a backlight assembly for a liquid crystal display (LCD) device, and more particularly, to a direct-type backlight assembly for an LCD device.

2. Discussion of the Related Art

In general, cathode ray tube (CRT) devices are commonly used as display devices, such as televisions and as monitors for instrumentation systems and information terminal systems. However, the CRT devices are large-sized, heavy weight, and require high driving voltages. Accordingly, flat panel display devices having thin profiles, light weight, and low power consumption have been developed.

The flat panel display devices include LCD devices, plasma display panel (PDP) devices, field emission display (FED) devices, and electroluminescent display (ELD) devices. Among these different display devices, the LCD devices have been developed due to their low power consumption and good portability in display devices such as desktop and laptop computer monitors, large-sized outdoor display monitors of more than 30 inches, and wall television systems.

The LCD devices are driven based on optical anisotropy and polarization characteristics of liquid crystal material. In general, the LCD device includes two substrates, which are spaced apart and facing each other, and a liquid crystal layer is interposed between the two substrates. Each of the substrates include an electrode, wherein each of the electrodes on each of the substrates also are facing each other. Accordingly, when a voltage is supplied to each of the electrodes, an electric field is induced between the electrodes. Thus, alignment of liquid crystal molecules of the liquid crystal material is changed due to the induced electric field. In addition, images are displayed by varying an intensity or direction of the electric field in order to vary light transmittance through the alignment of the liquid crystal molecules.

However, since the LCD device is not luminescent, it requires an additional light source in order to display the images. Generally, a backlight assembly is disposed behind an LCD panel for providing the light to the LCD panel. The backlight assembly is classified into one of an edge-type and a direct-type backlight assembly according to a position of a light source with respect to a display area. The direct-type backlight assembly is commonly used for large-sized LCD devices of more than 30 inches due to its high utilization efficiency, easy handling, and non-limited range of sizes.

In addition, the direct-type backlight assembly does not require a light guide plate, which changes linear light emitted from a lamp into planar light. The direct-type backlight assembly includes a plurality of lamps that are disposed under the display area and emit light, a reflecting sheet is disposed behind the lamps and reflects the light emitted from the lamps toward the display area to prevent loss of the light, and a diffusing plate is disposed over the lamps and scatters the light to uniformly diffuse the light.

Since a considerable amount of space exists between the lamps and the diffusing plate, the diffusing plate will deform (or sag) due to its weight or will deform due to thermal expansion caused by the heat generated by the lamps. To solve these problems, a plurality of guides are provided between the reflecting sheet and the diffusing plate to prevent deformation of the diffusing plate and for fixing the lamps.

FIG. 1 is a cross sectional view of a direct-type backlight assembly for an LCD device according to the related art, and FIG. 2 is an upper perspective view of a lamp guide of the direct-type backlight assembly of FIG. 1 according to the related art. In FIGS. 1 and 2, lamps 20 are disposed over a lower case 3, and a lamp guide 10 is attached to the lower case 3. In addition, a diffusing plate 5, a prism sheet 8, and a liquid crystal panel 9 are sequentially disposed over the lamp guide 10. The lamp guide 10 affixes the lamps 20 and prevents deformation of the diffusing plate 5, the prism sheet 8, and the liquid crystal panel 9.

The lamp guide 10 includes a plate 11, a sheet supporting portion 12, two fixing projections 13, and two lamp holders 14. The sheet supporting portion 12 is disposed on the plate 11 and prevents the diffusing plate 5 from deforming along a direction toward the lower case 3. The fixing projections 13 are formed in a lower part of the lamp guide 10 for affixing the lamp guide 10 to the lower case 3 through projection-inserting holes 6, wherein the lamps 20 are positioned within the lamp holders 14. The lamp holders 14 are formed on the plate 11 and affix two lamps 20. In addition, a reflector 4 is formed between the lower case 3 and the plate 11 of the lamp guide 10.

FIG. 3 is a lower perspective view the lamp guide of FIG. 2 according to the related art. In FIG. 3, a screw 15 is further used to combine the lower case 3 (in FIG. 1) with the lamp guide 10, wherein the screw 15 penetrates through the lower case 3 (in FIG. 1) to be mechanically coupled to the lamp guide 10. Alternatively, instead of the screw 15, an adhesive or a bonding tape may be used between the plate 11 of the lamp guide 10 and the lower case 3 to contact each other.

However, if the lamp guide 10 is affixed to the lower case 3 using only the fixing projections 13, the fixing projections 13 may easily become separated from the projection-inserting holes 6 due to forceful impacts imparted to the LCD device. Furthermore, additional utilization of the adhesive tape or the screw increases manufacturing costs and reduces production efficiency due to an added process of attaching the adhesive tape and/or screw.

SUMMARY OF THE INVENTION

Accordingly, the present invention is directed to a direct-type backlight assembly for an LCD device that substantially obviates one or more problems due to limitations and disadvantages of the related art.

An object of the present invention is to provide a direct-type backlight assembly for an LCD device that prevents separating of a lamp guide from a lower case.

Another object of the present invention is to provide a direct-type backlight assembly for an LCD device that improves operation and production efficiencies.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a direct-type backlight assembly for a liquid crystal display device includes a lower case, a plurality of lamps disposed over a first surface of the lower case, a plurality of optical sheets disposed over the first surface of the lower case, and a lamp guide disposed on the first surface of the lower case, the lamp guide including a plate parallel to and disposed on the first surface of the lower case, a sheet supporting portion formed on a first surface of the plate to support the optical sheets, a plurality of lamp holders formed on the first surface of the plate to affix the plurality of lamps therein, and a case connector connected to a second surface of the plate and having a plurality of protrusions facing the second surface of the plate.

In another aspect, a lamp guide device includes a plate, a sheet supporting portion formed on a first surface of the plate, a plurality of lamp holders formed on the first surface of the plate to affix the plurality of lamps therein, and a case connector connected to a second surface of the plate and having a plurality of protrusions facing the second surface of the plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to embodiments of the present invention, which are illustrated in the accompanying drawings.

Figure 1:
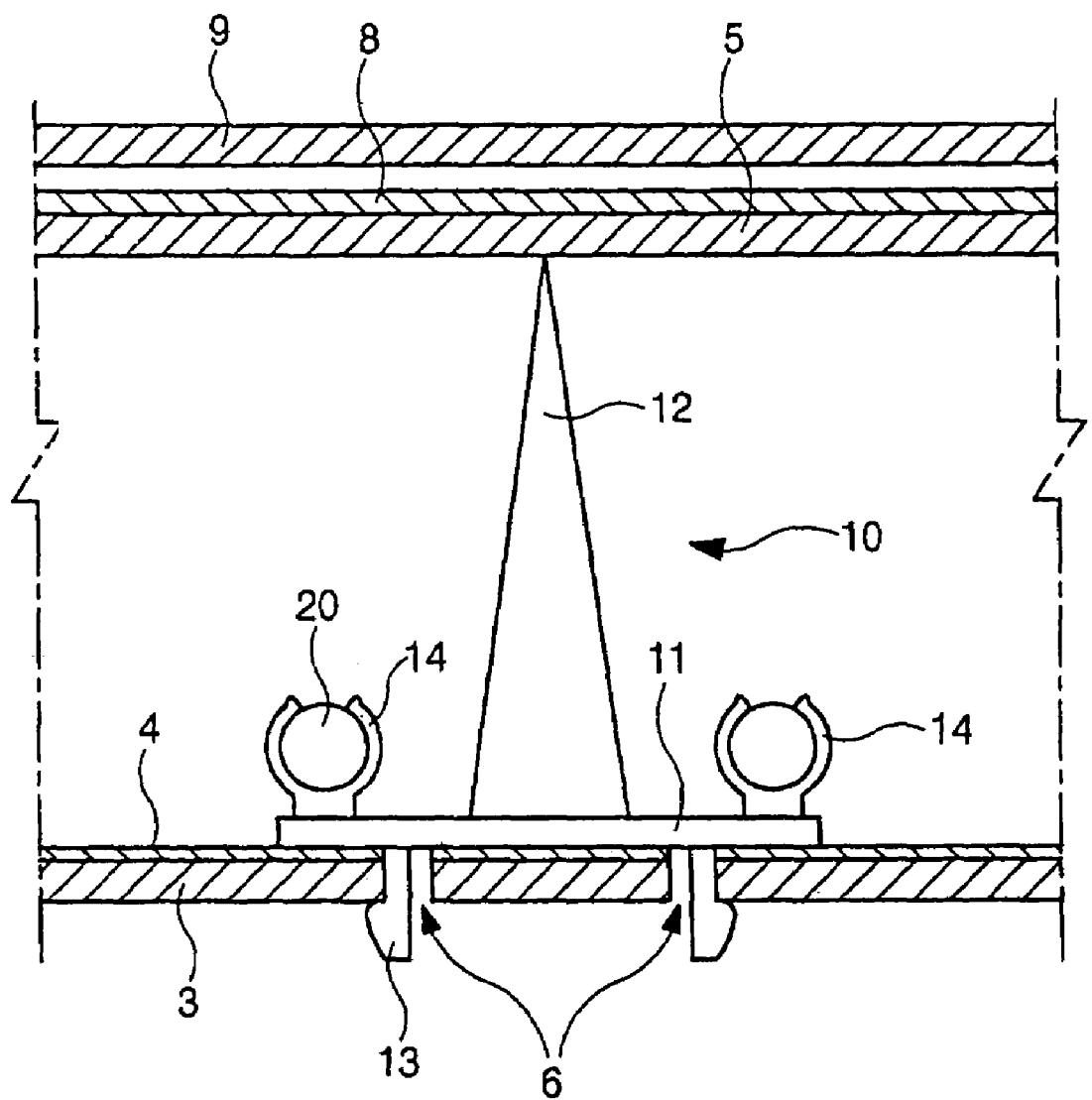
FIG. 1 is a cross sectional view of a direct-type backlight assembly for an LCD device according to the related art.
Figure 2:
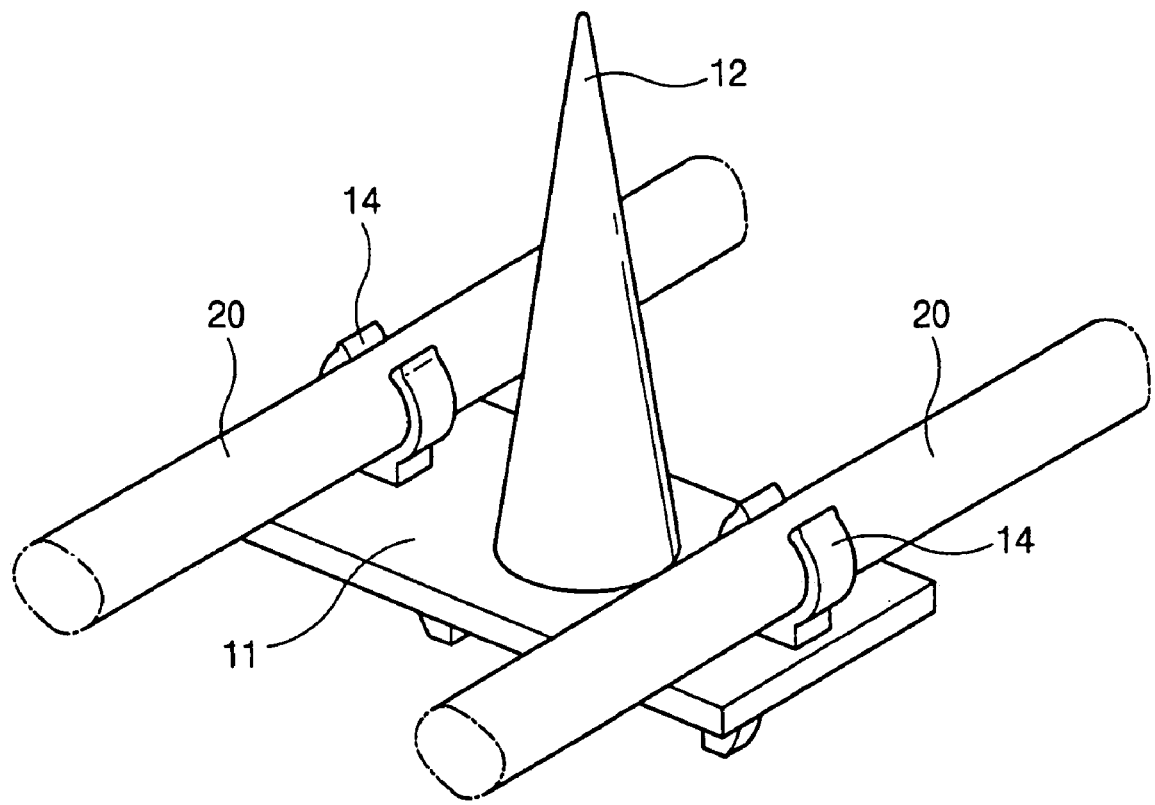
FIG. 2 is an upper perspective view of a lamp guide of the direct-type backlight assembly of FIG. 1 according to the related art.
Figure 3:
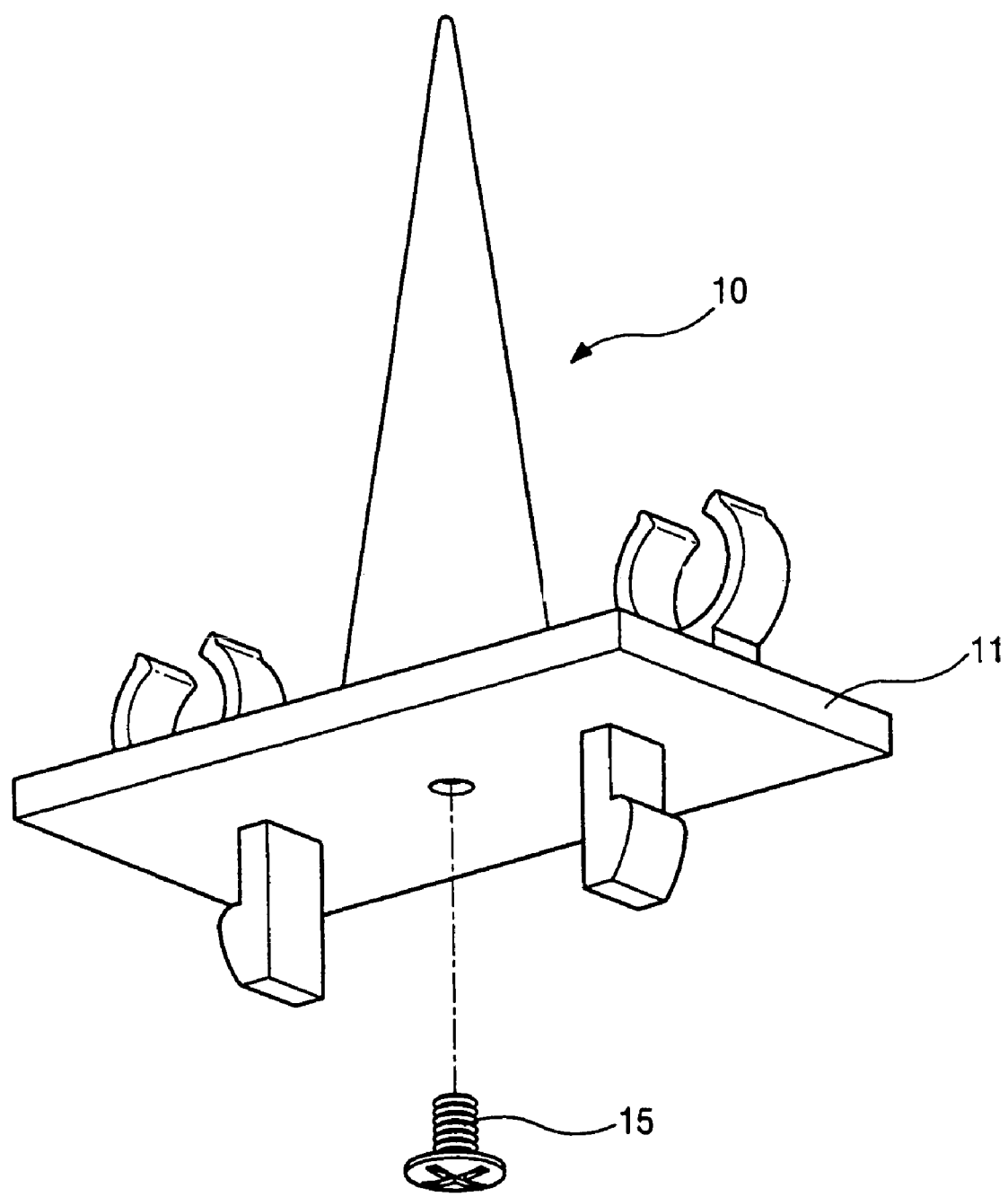
FIG. 3 is a lower perspective view of the lamp guide of FIG. 2 according to the related art.
Figure 4:
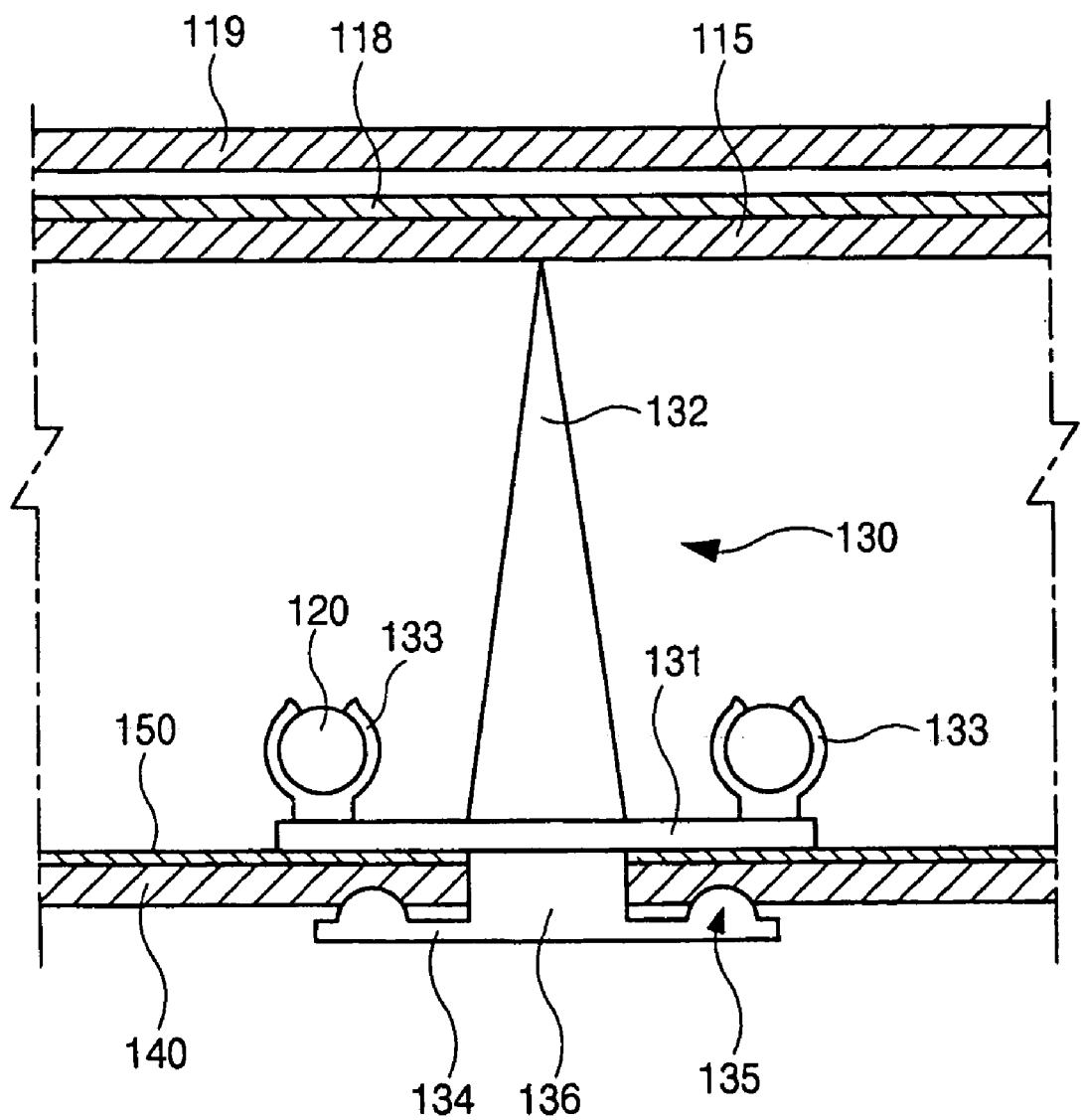
FIG. 4 is a cross sectional view of an exemplary backlight assembly for an LCD device according to the present invention.
Figure 5:
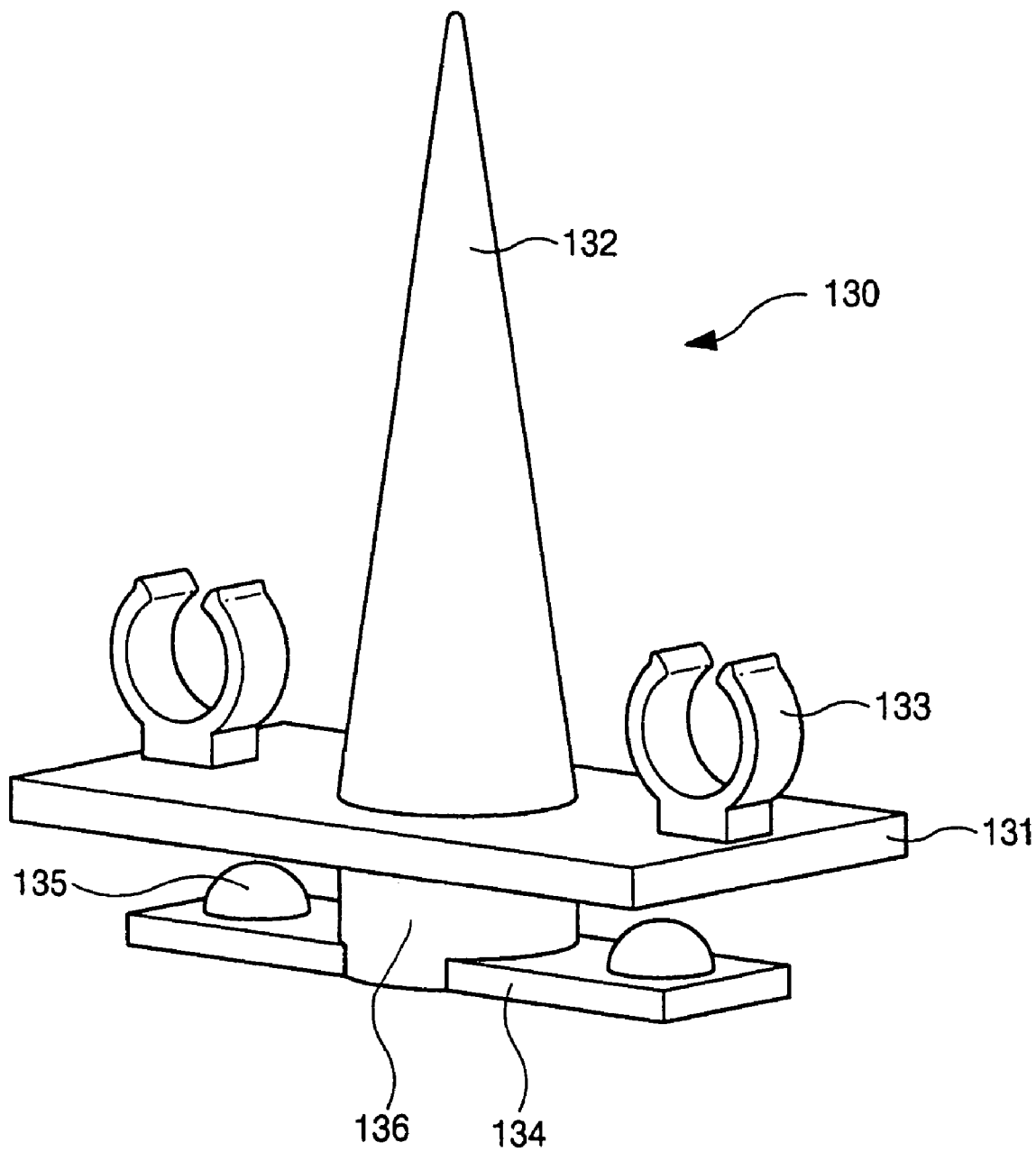
FIG. 5 is a perspective view of the exemplary lamp guide of the backlight assembly of FIG. 4 according to the present invention.

FIG. 4 is a cross sectional view of an exemplary backlight assembly for an LCD device according to the present invention, and FIG. 5 is a perspective view of the exemplary lamp guide of the backlight assembly of FIG. 4 according to the present invention. In FIGS. 4 and 5, a plurality of lamps 120 may be disposed over an upper surface of a lower case 140, and a lamp guide 130 may be positioned on the upper surface of the lower case 140. In addition, a plurality of optical sheets 115 and 118 and an LCD panel 119 may be sequentially disposed over the lamp guide 130. For example, the plurality of optical sheets 115 and 118 may include diffusing plates and prism sheets.

The lamp guide 130 may include a plate 131, a sheet supporting portion 132, a lamp holder 133, and a case connector 134. The plate 131 may be disposed parallel to an inner lower surface of the lower case 140, and the sheet supporting portion 132 may be disposed on the plate 131, wherein the sheet supporting portion 132 may support the diffusing plate 115. The sheet supporting portion 132 may have a circular conical shape in order to minimize contact the diffusing plate 115, thereby preventing scratches while preventing the diffusing plate 115 from deforming along a direction toward the lower case 140. Alternatively, the sheet supporting portion 132 may have other geometries, or may include a plurality of different geometries incorporated into a single structure. For example, the sheet supporting portion 132 may have a square base and conical upper portions, or may contact the diffusing plate 115 at a plurality of locations.

The lamp holders 133 may be positioned on the upper surface of the lower case 140 at opposing sides of the sheet supporting portion 132, and may hold each one of the lamps 120. Alternatively, the lamp holders 133 may be disposed at other locations with respect to the sheet supporting portion 132, and may include more or less than two of the lamp holders 133. Furthermore, although the lamp holders 133 are shown to extend part way around a diameter of the lamps 120, the lamp holders 133 may completely extend around the diameter of the lamps 120, or may extend half-way around the diameter of the lamps 120.

The case connector 134 may be formed under the plate 131 for combining the lamp guide 130 with the lower case 140 using a connection part 136 having a cylindrical shape. Alternatively, the connection part 136 may have other geometric shapes, such as elliptical or polygonal shapes, or may have combinations of different geometric shapes. The case connector 134 may be connected to a lower surface of the plate 131 and may be disposed parallel to the plate 131 and to a lower surface of the lower case 140. In addition, a plurality of protrusions 135 having hemispherical shapes may be formed on an upper surface of the case connector 134, and may engage with concavities 142 provided in a lower surface of the lower case 140. Alternatively, the protrusions 135 may have other geometrical shapes, such as conical, polygonal, or triangular shapes. Furthermore, although two protrusions 135 are shown, additional numbers of the protrusions 135 may be formed on the upper surface of the case connector 134. In addition, the number of the concavities 142 may be provided to correspond with the number of protrusions 135.

The lamp guide 130 may be formed of a synthetic resin, such as polycarbonate. For example, the lamp guide 130 may be made by a molding method, wherein the plate 131, the sheet supporting portion 132, the lamp holders 133, the case connector 134, the protrusions 135, and the connection part 136 may be formed as a single structure.

A reflector 150 may be provided between the lower case 140 and the plate 131 of the lamp guide 130, thereby reflecting light emitted from the lamps 133 toward a display area of the LCD panel 119 in order to prevent loss of the light. Of course, the reflector 150 may be provided along an entire surface of the lower case 140, or may be provided within regions between adjacent lamp guides 130. Moreover, additional reflectors may be provided along the plate 131 of the lamp guide 130 between the lamp holders 133, and may also be provided along the sheet supporting portion 132.

Figure 6A:
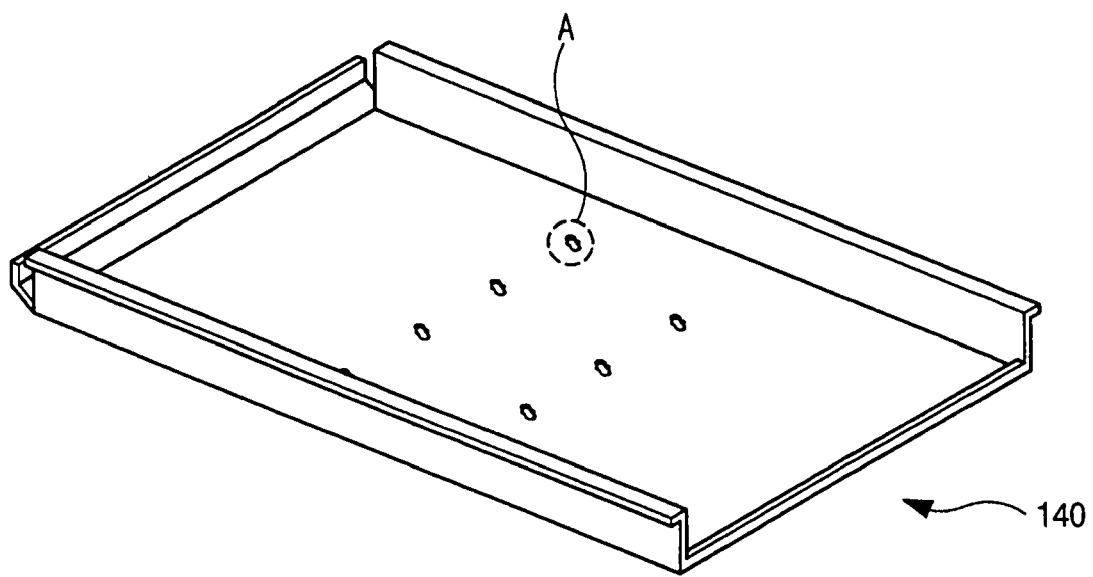
FIG. 6A is a perspective view of an exemplary lower case of the backlight assembly of FIG. 4 according to the present invention.
Figure 6B:
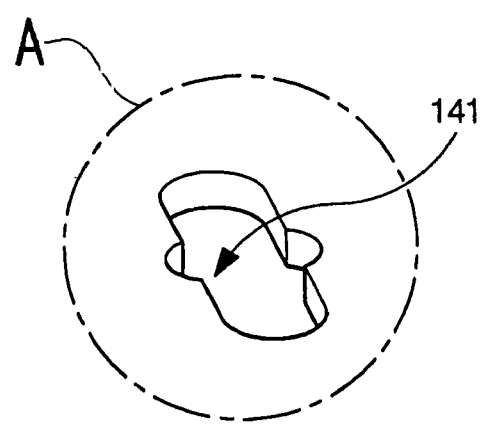
FIG. 6B is an enlarged view of part "A" of FIG. 6A according to the present invention.

FIG. 6A is a perspective view of an exemplary lower case of the backlight assembly of FIG. 4 according to the present invention, and FIG. 6B is an enlarged view of part "A" of FIG. 6A according to the present invention. In FIGS. 6A and 6B, the lower case 140 may have a plurality of guide connecting holes 141 for inserting and separating the case connector 134 of the lamp guide 130. Each guide connecting hole 141 may correspond to one case connector 134. The guide connecting hole 141 may have the same shape as the connection part 136 and the case connector 134, and may have a size larger than the connection part 136 and the case connector 134 so that the case connector 134 may pass freely through the guide connecting hole 141.

Figure 7:
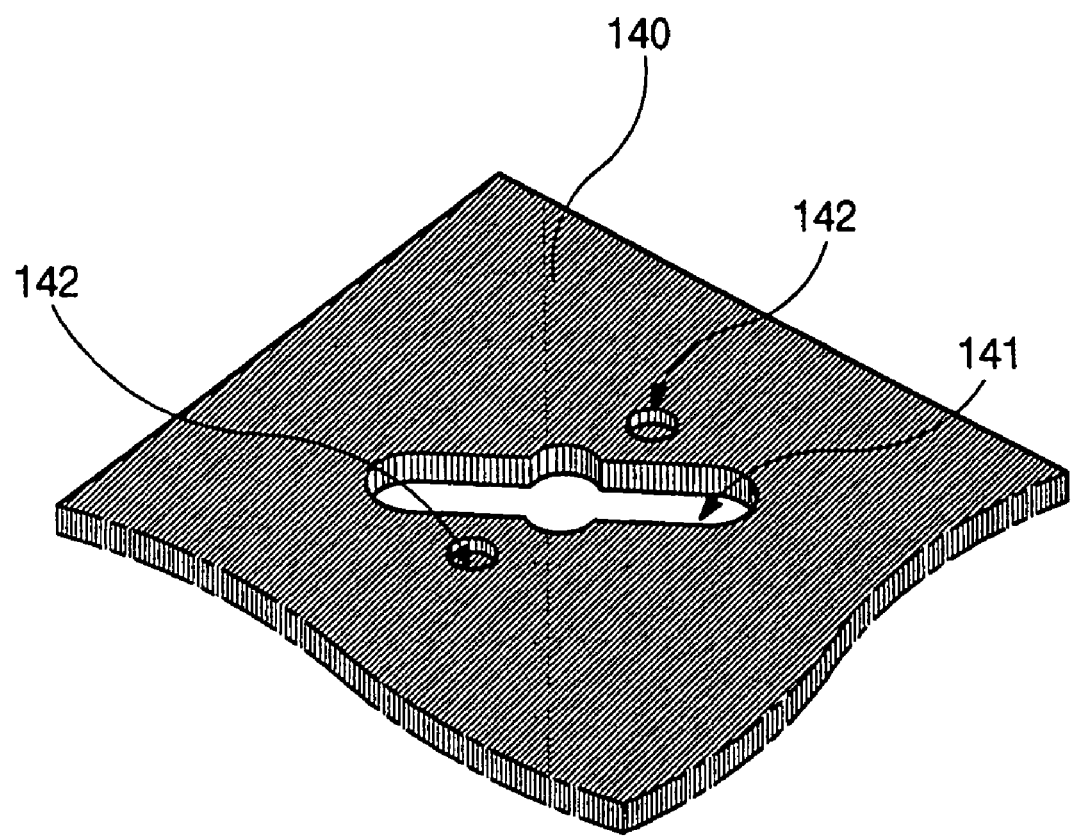
FIG. 7 is a perspective view of an exemplary outer surface of the lower case of the backlight assembly of FIG. 4 according to the present invention.

FIG. 7 is a perspective view of an exemplary outer surface of the lower case of the backlight assembly of FIG. 4 according to the present invention. In FIG. 7, the concavities 142 may be formed on an outer surface of the lower case 140, i.e., a lower surface of the lower case 140, to be combined with the protrusions 135 of the case connector 134 (in FIG. 5). In addition, each of the concavities 142 may penetrate through the lower surface of the lower case 140. Accordingly, the case connector 134 and the connector portion 136 may be inserted through the guide connecting hole 141. Then, the lamp guide 130 may be rotated such that the protrusions 135 of the case connector 134 may engage the concavities 142 of the lower case 140. In addition, the orientation of the case connector 134 with the plate 131 may determine the amount of rotation of the lamp guide 130. For example, although the case connector 134 is shown to be parallel to the plate 131, the case connector 134 may be offset from the plate 131. Accordingly, the amount of rotation of the lamp guide 130 may be dependent upon the offset of the case connector 134 from the plate 131.

According to the present invention, since a lamp guide of a backlight assembly may be formed by a molding method and formed as a single structure, problems associated with combining and separating the lamp guide from a lower case may be resolved. In addition, problems due to forceful impacts may be prevented. In addition, operation and production efficiencies may be improved.

It will be apparent to those skilled in the art that various modifications and variations can be made in the backlight assembly for an LCD device of the present invention without departing from the spirit or scope of the invention. Thus, it is intended that the present invention cover the modifications and variations of this invention provided they come within the scope of the appended claims and their equivalents.

What is claimed is:

1. A direct-type backlight assembly for a liquid crystal display device, comprising:
    a lower case;
    a plurality of lamps disposed over a first surface of the lower case;
    a plurality of optical sheets disposed over the first surface of the lower case; and
    a lamp guide disposed on the first surface of the lower case, the lamp guide including a plate parallel to and disposed on the first surface of the lower case, a sheet supporting portion formed on a first surface of the plate to support the optical sheets, a plurality of lamp holders formed on the first surface of the plate to affix the plurality of lamps therein, and a case connector connected to a second surface of the plate and having a plurality of protrusions facing the second surface of the plate.

2. The backlight assembly according to claim 1, wherein the lower case includes a guide connecting hole for inserting the case connector of the lamp guide.

3. The backlight assembly according to claim 1, wherein the lower case includes a plurality of concavities to engage the protrusions on a second surface thereof.

4. The backlight assembly according to claim 3, wherein the lower case includes a guide connecting hole for inserting the case connector of the lamp guide, and a plurality of concavities disposed along a first direction to engage the protrusions on a second surface thereof.

5. The backlight assembly according to claim 4, wherein the guide connecting hole includes an elongated shape along a second direction.

6. The backlight assembly according to claim 5, wherein the second direction of the guide connecting hole is offset from the first direction of the plurality of concavities.

7. The backlight assembly according to claim 1, wherein the sheet supporting portion has a conical shape.

8. The backlight assembly according to claim 1, further comprising a reflector disposed between the lower case and the plate of the lamp guide.

9. The backlight assembly according to claim 1, wherein the lamp guide is formed as a molded structure.

10. The backlight assembly according to claim 9, wherein the plate, the sheet supporting portion, the plurality of lamp holders, and the case connector are formed as a single structure.

11. The backlight assembly according to claim 1, wherein the plate is disposed parallel to the case connector.

12. The backlight assembly according to claim 11, wherein each of the protrusions is disposed beneath one of the lamp holders.

13. The backlight assembly according to claim 1, wherein the plurality of optical sheets include at least one of a diffusing plate and a prism sheet.

14. The backlight assembly according to claim 1, wherein the plurality of lamp holders include two lamp holders that are disposed at opposing sides of the sheet supporting portion.

15. The backlight assembly according to claim 1, wherein the plate is connected to the case connector via a connection portion.

16. The backlight assembly according to claim 15, wherein the connection portion has a cylindrical shape.

17. A lamp guide device, comprising:
    a plate;
    a sheet supporting portion formed on a first surface of the plate;
    a plurality of lamp holders formed on the first surface of the plate to affix a plurality of lamps therein; and
    a case connector connected to a second surface of the plate and having a plurality of protrusions facing the second surface of the plate.

18. The lamp guide device according to 17, wherein the sheet supporting portion has a conical shape.

19. The lamp guide device according to claim 17, further comprising a reflector disposed on the plate.

20. The lamp guide device according to claim 17, wherein the plate, the sheet supporting portion, the plurality of lamp holders, and the case connector are formed as a single structure.

21. The lamp guide device according to claim 17, wherein the plate is disposed parallel to the case connector.

22. The lamp guide device according to claim 21, wherein each of the protrusions is disposed beneath one of the lamp holders.

23. The lamp guide device according to claim 17, wherein the plurality of lamp holders include two lamp holders that are disposed at opposing sides of the sheet supporting portion.

24. The lamp guide device according to claim 17, wherein the plate is connected to the case connector via a connection portion.

25. The lamp guide device according to claim 24, wherein the connection portion has a cylindrical shape.

* * * * *